(12) United States Patent
Ko

(10) Patent No.: US 11,176,855 B2
(45) Date of Patent: Nov. 16, 2021

(54) FLOATING CONTROL DEVICE, OPERATION METHOD OF FLOATING CONTROL DEVICE AND INTERACTIVE DISPLAY SYSTEM

(71) Applicant: Acer Incorporated, New Taipei (TW)

(72) Inventor: Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/813,111

(22) Filed: Mar. 9, 2020

(65) Prior Publication Data

US 2021/0082325 A1 Mar. 18, 2021

(30) Foreign Application Priority Data

Sep. 17, 2019 (TW) .................................. 108133409

(51) Int. Cl.
*G09G 5/00* (2006.01)
*G09G 3/00* (2006.01)
*G06F 3/041* (2006.01)

(52) U.S. Cl.
CPC ........... *G09G 3/001* (2013.01); *G06F 3/0416* (2013.01); *G06F 2203/04101* (2013.01); *G09G 2354/00* (2013.01)

(58) Field of Classification Search
CPC .. G09G 3/001; G09G 2354/00; G06F 3/0416; G06F 2203/04101
USPC ........................................................ 345/156
See application file for complete search history.

(56) References Cited

U.S. PATENT DOCUMENTS

| | | | |
|---|---|---|---|
| 2007/0057787 A1* | 3/2007 | Helbing | G09F 9/33 340/565 |
| 2010/0053557 A1* | 3/2010 | Barnett | G03B 25/00 352/101 |
| 2010/0097448 A1* | 4/2010 | Gilbert | G09G 5/36 348/51 |
| 2012/0146897 A1* | 6/2012 | Yoshida | H04N 13/39 345/156 |
| 2015/0185841 A1 | 7/2015 | Levesque et al. | |
| 2015/0277610 A1 | 10/2015 | Kim et al. | |

(Continued)

FOREIGN PATENT DOCUMENTS

| | | |
|---|---|---|
| CN | 104391578 A | 3/2015 |
| TW | 201530350 A | 8/2015 |
| TW | 201832156 A | 9/2018 |

OTHER PUBLICATIONS

Taiwanese Office Action and Search Report, dated Aug. 24, 2020, for Taiwanese Application No. 108133409.

*Primary Examiner* — Jonathan M Blancha

(74) *Attorney, Agent, or Firm* — Birch, Stewart, Kolasch & Birch, LLP

(57) ABSTRACT

A floating control device, an operation method of a floating control device, and an interactive display system are provided. The floating control device includes a motor, a rotating shaft, a rotating component, a plurality of distance sensors and a signal processing unit. The rotating shaft is connected to the motor. The motor drives the rotating component to rotate around the rotating shaft. The distance sensors are disposed on the rotating component. The signal processing unit is configured to receive a plurality of sensing signals from the distance sensors to obtain an operation signal.

20 Claims, 8 Drawing Sheets

(56) References Cited

U.S. PATENT DOCUMENTS

2017/0124925 A1* 5/2017 Chykeyuk .............. G09G 3/001
2017/0223344 A1* 8/2017 Kaehler ............... H04N 13/393

* cited by examiner

FLOATING CONTROL DEVICE, OPERATION METHOD OF FLOATING CONTROL DEVICE AND INTERACTIVE DISPLAY SYSTEM

This application claims the benefit of Taiwan application Serial No. 108133409, filed Sep. 17, 2019, the subject matter of which is incorporated herein by reference.

BACKGROUND OF THE INVENTION

Field of the Invention

The invention relates in general to a control device, an operation method and a display system, and more particularly to a floating control device, an operation method of a floating control device, and an interactive display system.

Description of the Related Art

Following the upsurge of the 3D technology, a holographic display dispensing with the use of glasses has long been a dream to many people, and a space-wise display occupying least space is also a goal desired by many people. The aerial display (also referred as air display) and the floating display are relevant technologies before the holographic display is provided. The aerial display has different types, such as reflective type, refractive type, volumetric type, and curtain type. The volumetric type display achieves the effect of visual residue through high speed. Both the reflection and the refraction of images are controlled through the use of optical path, and the display content is generated on a second plane of the space. The curtain type display scatters the projection content to the eyes through perturbed particles (air, water, mist).

Currently, the displays exemplified above are controlled through the use of a mouse and a keyboard or controlled through the use of VR cane aids. However, the user still cannot directly perform an intuitive operation to the display space. Therefore, it has become a prominent task for the industries to provide a technology allowing the user to perform an intuitive operation to the display space directly.

SUMMARY OF THE INVENTION

The invention is directed to a floating control device, an operation method of a floating control device, and an interactive display system. Through the cooperative design of a rotating component and a plurality of distance sensors, the floating control device causes a space sensing range of the floating control device to fall within the space display range. The user can directly operate on a three-dimensional image to complete an intuitive operation.

According to one embodiment of the present invention, a floating control device is provided. The floating control device includes a motor, a rotating shaft, a rotating component, a plurality of distance sensors and a signal processing unit. The rotating shaft is connected to the motor. The motor drives the rotating component to rotate around the rotating shaft. The distance sensors are disposed on the rotating component. The signal processing unit is configured to receive a plurality of sensing signals from the distance sensors to obtain an operation signal.

According to another embodiment of the present invention, an operation method of a floating control device is provided. The operation method of a floating control device includes the following steps. A rotating component is rotated to drive a plurality of distance sensors disposed on the rotating component to rotate. A plurality of sensing signals are received from the distance sensors. The sensing signals are converted into an operation signal.

According to an alternate embodiment of the present invention, an interactive display system is provided. The interactive display system includes a floating display device and a floating control device. The floating display device is configured to display a three-dimensional image in a space display range. The floating control device includes a motor, a rotating shaft, a rotating component, a plurality of distance sensors, and a signal processing unit. The rotating shaft is connected to the motor. The motor drives the rotating component to rotate around the rotating shaft. The distance sensors are disposed on the rotating component. A space sensing range of the distance sensors falls within the space display range. The signal processing unit is configured to receive a plurality of sensing signals from the distance sensors to obtain an operation signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
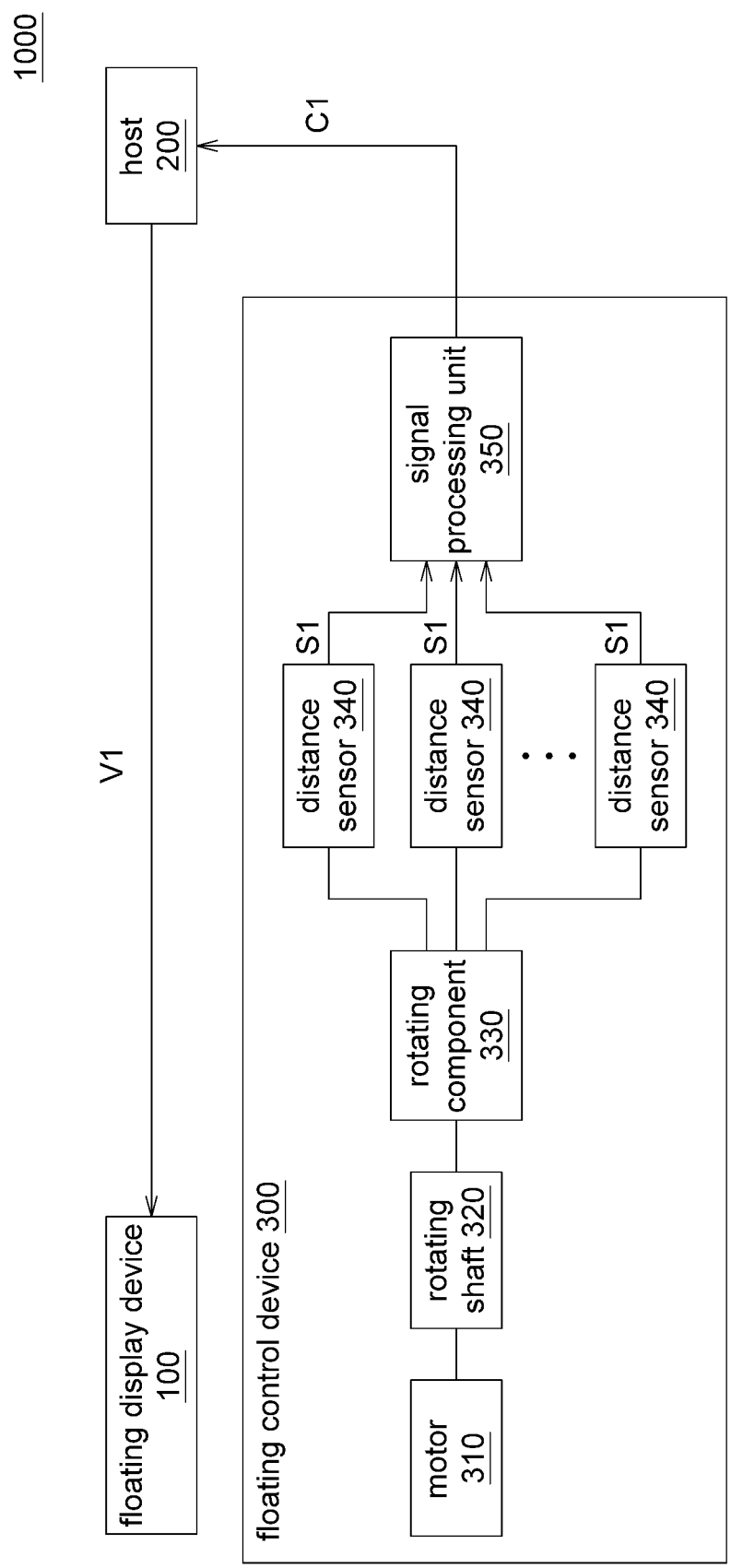
FIG. 1 is a block diagram of an interactive display system according to an embodiment.
Figure 2:
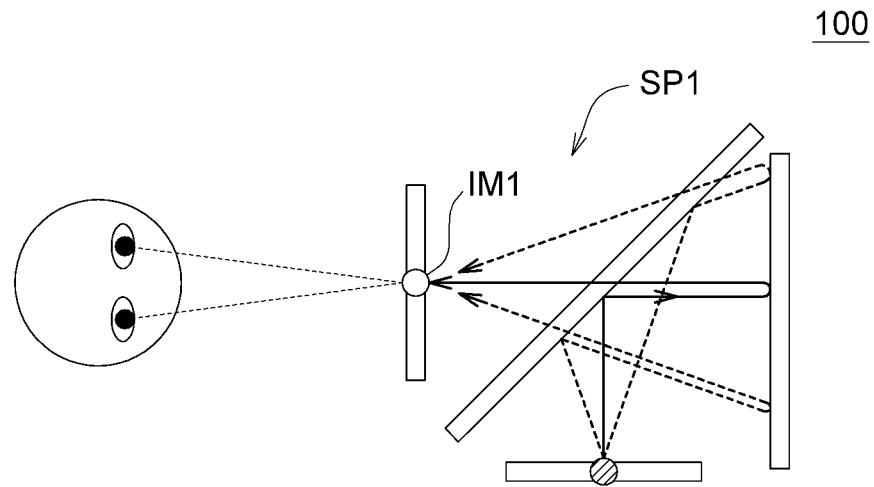
FIG. 2 is a schematic diagram of a floating display device according to an embodiment.
Figure 3:
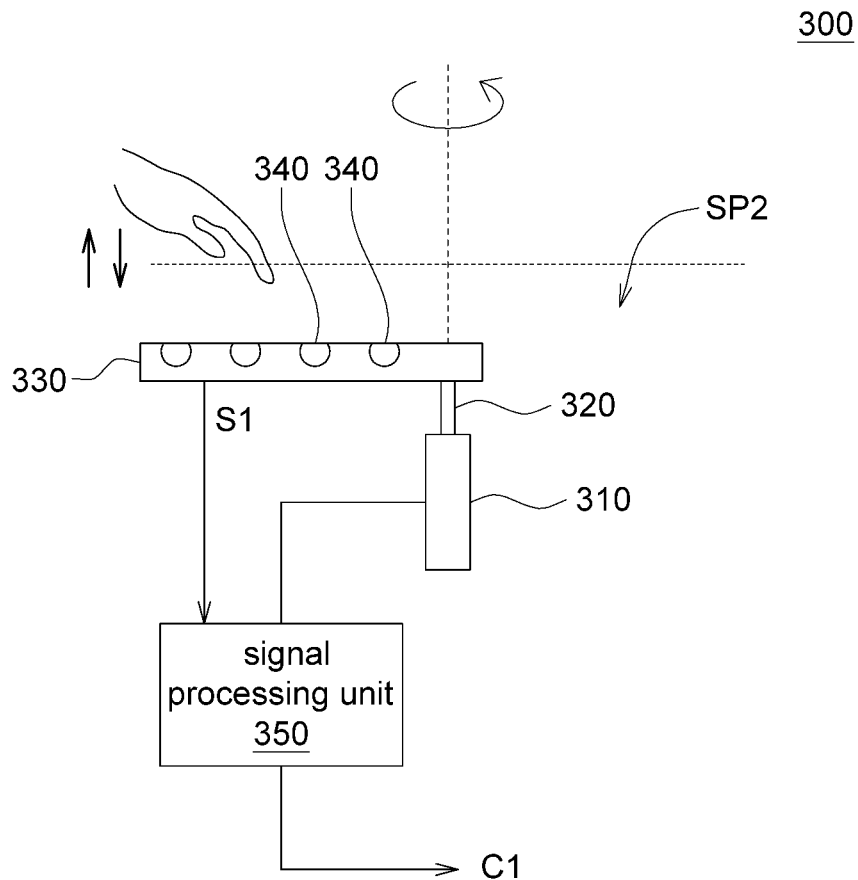
FIG. 3 is a schematic diagram of a floating control device according to an embodiment.

Refer to FIGS. 1 to 3. FIG. 1 is a block diagram of an interactive display system 1000 according to an embodiment. FIG. 2 is a schematic diagram of a floating display device 100 according to an embodiment. FIG. 3 is a schematic diagram of a floating control device 300 according to an embodiment. The interactive display system 1000 includes a floating display device 100, a floating control device 300, and a host 200. The host 200 provides a display signal V1 to the floating display device 100. The floating display device 100 is configured to display a three-dimensional image IM1 in a space display range SP1. A space sensing range SP2 of the floating control device 300 falls within the space display range SP1. The user can perform an operation to the three-dimensional image IM1 directly. The host 200 obtains an operation signal C1 from the floating control device 300 to complete an intuitive operation. Detailed operations of the internal elements of the device are disclosed below.

As indicated in FIG. 1 and FIG. 3, the floating control device 300 includes a motor 310, a rotating shaft 320, a rotating component 330, a plurality of distance sensors 340, and a signal processing unit 350. The motor 310 can be realized by such as a DC motor, an AC motor or a step motor. The rotating shaft 320 is connected to the motor 310. The motor 310 drives the rotating shaft 320 rotated at a fixed speed. The rotating component 330 is connected to the rotating shaft 320. The rotating component 330 can be realized by such as a planar structure. The motor 310 drives the rotating component 330 to rotate around the rotating shaft 320. The distance sensors 340 are disposed on the rotating component 330, and can be realized by such as an infrared receiver, a laser receiver, or a light sensitive sensor. The distance sensors 340 have a space sensing range SP2. The user can wave, swing or click with a finger or a palm within the space sensing range SP2. The distance sensors 340 can sense the distance to the shelter within the space sensing range SP2 to obtain the positions of the finger or the palm. Both the space sensing range SP2 and the space display range SP1 (illustrated in FIG. 2) are a three-dimensional space. The space sensing range SP2 overlaps with and falls within the space display range SP1. Thus, within the space sensing range SP2, the user can operate the three-dimensional image IM (illustrated in FIG. 2) displayed within the space display range SP1.

The signal processing unit 350 is configured to receive sensing signals S1 from the distance sensors 340 to obtain an operation signal C1. The signal processing unit 350 can be realized by such as a chip, a circuit, a circuit board, or a storage device storing several programming codes.

Figure 4:
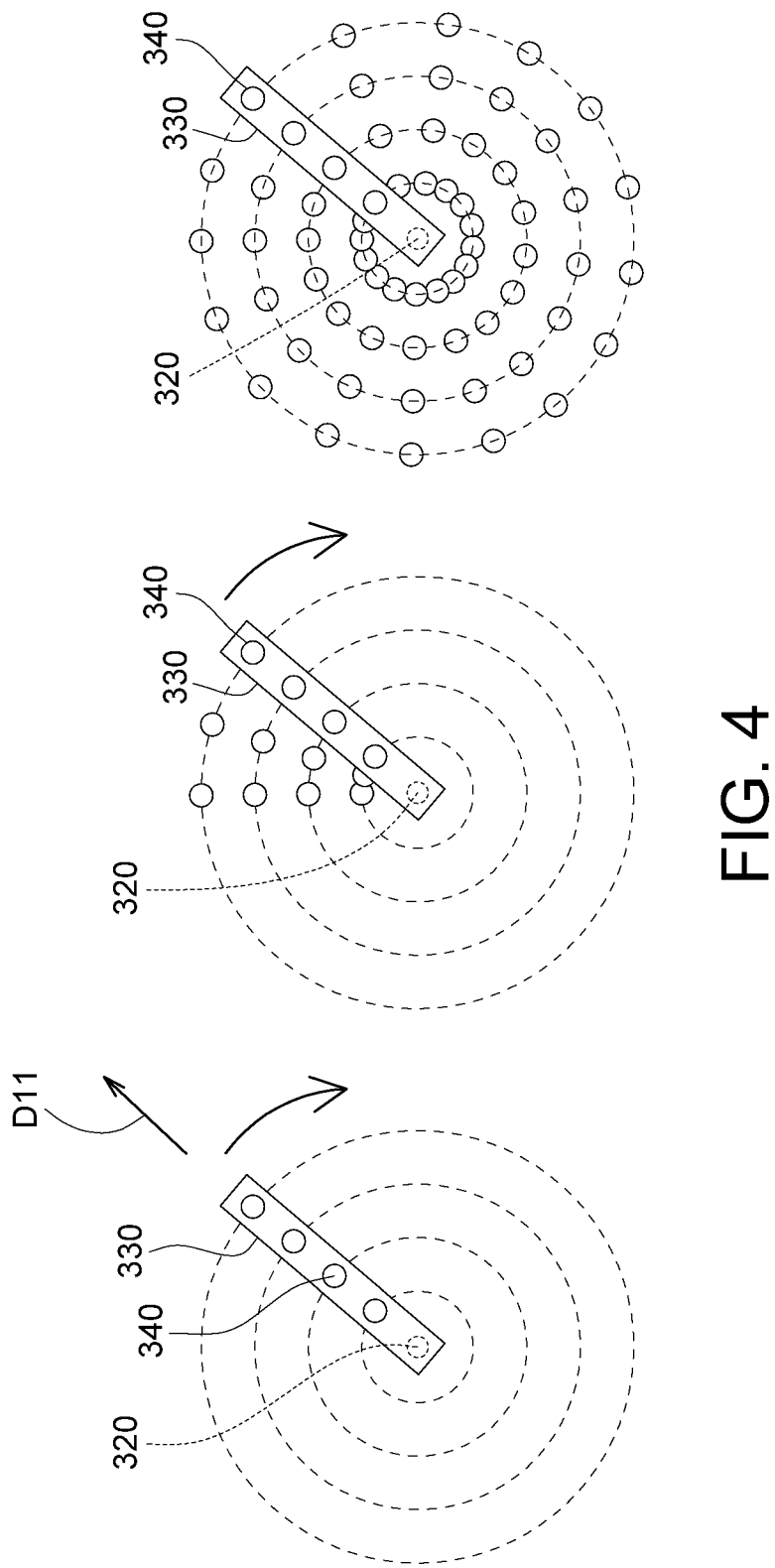
FIG. 4 is a top view of the rotating component and the distance sensors of FIG. 3.

Referring to FIG. 4, a top view of the rotating component 330 and the distance sensors 340 of FIG. 3 is shown. In the embodiment as indicated in FIG. 4, the rotating component 330 is extended towards a straight direction D11 from the rotating shaft 320 to form a branch structure (a uni-branch structure). The distance sensors 340 are arranged along the straight direction D11. The distance sensors 340 are evenly distributed over the rotating component 330.

As indicated in the left-hand diagram of FIG. 4, the rotating component 330 drives the distance sensors 340 to rotate. Each of the distance sensors 340 performs a sensing operation once every one sensing period. As indicated in the middle diagram of FIG. 4, after three sensing periods, each of the distance sensors 340 performs the sensing operation thrice at three different positions. As indicated in the right-hand diagram of FIG. 4, after the rotating component 330 drives the distance sensors 340 to rotate for 360°, each of the distance sensors 340 performs N times of sensing operation at N positions evenly distributed over the entire range of 360°. Even when the distance sensors 340 are merely arranged as a uni-branch structure, the sensing signals S1 detected over the enter range of 360° still can be obtained through the rotation of the rotating component 330.

Figure 5:
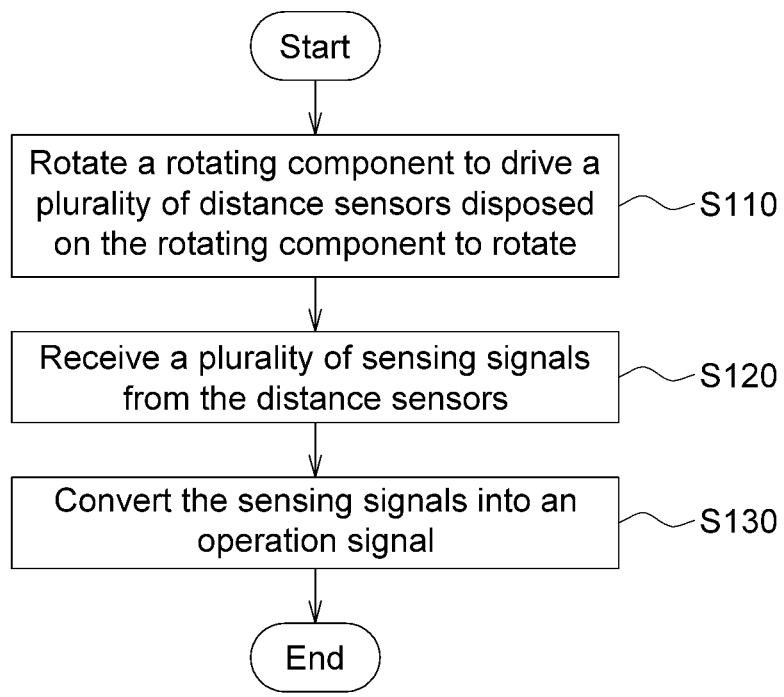
FIG. 5 is a flowchart of an operation method of a floating control device according to an embodiment.

Referring to FIG. 5, a flowchart of an operation method of a floating control device 300 according to an embodiment is shown. Firstly, the method begins at step S110, the rotating component 330 is driven to rotate by the motor 310 such that the distance sensors 340 disposed on the rotating component 330 are also driven to rotate.

Next, the method proceeds to step S120, a plurality of sensing signals S1 are received from the distance sensors 340. In the present step, each of the distance sensors 340 performs a sensing operation once every one sensing period. After the rotating component 330 drives the distance sensors 340 to rotate for 360°, each of the distance sensors 340 performs N times of sensing operation at N positions. Suppose the rotating component 330 has a rotation cycle of T seconds. The step of receiving sensing signals S1 from the distance sensors 340 is performed at an interval of T/N seconds (that is, the said sensing period), such that the rotating component 330 can receive the sensing signals S1 at N evenly spaced positions of 360°. The sensing signals S1 correspond to a two-dimensional polar coordinate system (such as $(r, \theta)$). The distance detected by each of the sensing signals S1 represents the shielding situation of the finger or the palm.

Then, the method proceeds to step S130, the sensing signals S1 are converted into an operation signal C1 by the signal processing unit 350. In the present step, the signal processing unit 350 performs a conversion between the polar coordinate system and the Cartesian coordinate system. For example, the signal processing unit 350 converts $(r, \theta)$ into $(x, y)$. Thus, the operation signal C1 represents the shielding situation of the finger or the palm at each position of the space sensing range SP2 within the rotation cycle of T seconds. In an embodiment, the finger or the palm is detected within the space sensing range SP2 at a height of 1 to 10 cm. In another embodiment, the sensing signals S1 further include height information and correspond to a three-dimensional polar coordinate system (such as $(r, \theta, z)$). When performing the conversion between the polar coordinate system and the Cartesian coordinate system, the signal processing unit 350 converts $(r, \theta, z)$ into $(x, y, z)$. Thus, which of the N virtual planes the finger or the palm is located within the space sensing range SP2 can be analyzed. Therefore, when the finger or the palm is too close to the rotating component 330, a reminder message will be presented to remind the user that the distance is too close.

As indicated in FIG. 1, after the host 200 continuously receives the operation signal C1 for a plurality of cycles, the continuous movement of the finger or the palm will be obtained. Then, the host 200 controls the display signal V1 to generate a three-dimensional image IM corresponding to the operation signal C1. Thus, the user can interact with the three-dimensional image IM.

Figure 6:
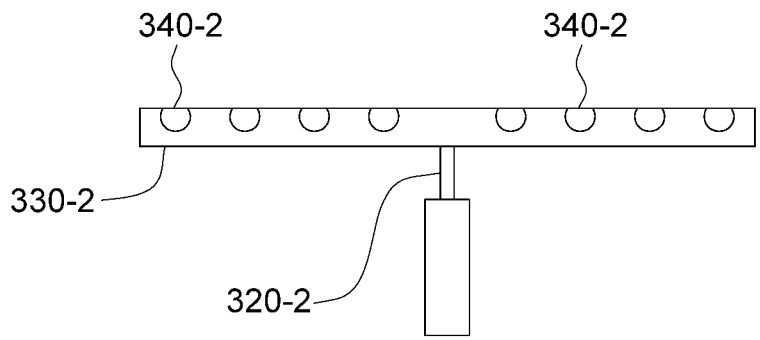
FIG. 6 is a schematic diagram of a rotating component and a plurality of distance sensors according to another embodiment.
Figure 7:
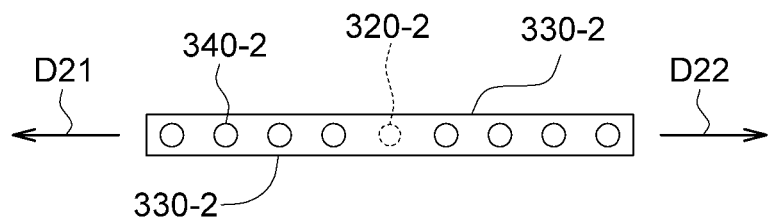
FIG. 7 is a top view of the rotating component and the distance sensors of FIG. 6.

Apart from the design exemplified in above embodiments, the rotating component 330 and the distance sensors 340 can adopt other types of design. Refer to FIG. 6 and FIG. 7. FIG. 6 is a schematic diagram of a rotating component 330-2 and a plurality of distance sensors 340-2 according to another embodiment. FIG. 7 is a top view of the rotating component 330-2 and the distance sensors 340-2 of FIG. 6. In the embodiment as indicted in FIGS. 6 to 7, the rotating component 330-2 is extended towards two straight directions D21 and D22 from the rotating shaft 320-2 to form a bi-branch structure. The straight directions D21 and D22 are opposite to each other. The distance sensors 340-2 are arranged along the straight directions D21 and D22. In the present embodiment, the design of bi-branch structure is adopted. That is, when the rotating component 330-2 rotates for 180°, the distance sensors 340-2 will be distributed for 360° over the space sensing range SP2.

Figure 8:
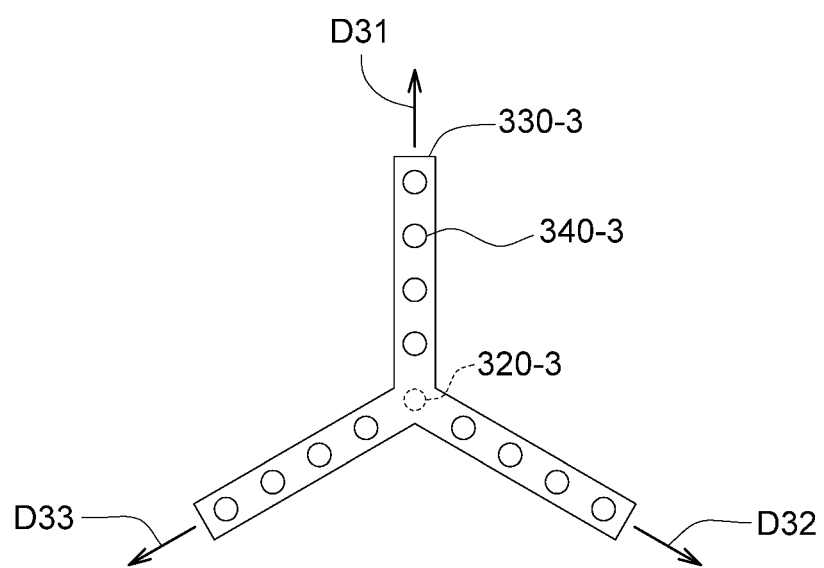
FIG. 8 is a top view of a rotating component and a plurality of distance sensors according to another embodiment.

Referring to FIG. 8, a top view of a rotating component 330-3 and a plurality of distance sensors 340-3 according to another embodiment is shown. In the embodiment as indicated in FIG. 8, the rotating component 330-3 is extended towards three straight directions D31, D32 and D33 from the rotating shaft 320-3 to form a tri-branch structure. Every two of the straight directions D31, D32 and D33 form an angle of 120°. The distance sensors 340-3 are arranged along the straight directions D31, D32 and D33. In the present embodiment, the design of tri-branch structure is adopted. That is, when the rotating component 330-3 rotates for 120°, the distance sensors 340-3 will be distributed for 360° over the space sensing range SP2.

Figure 9:
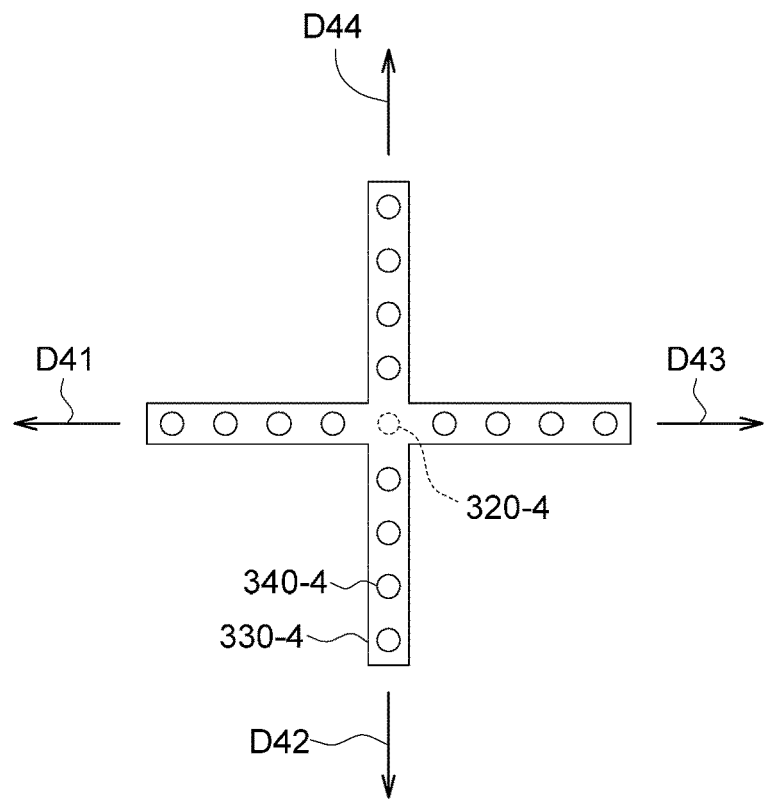
FIG. 9 is a top view of a rotating component and a plurality of distance sensors according to another embodiment.

Referring to FIG. 9, a top view of a rotating component 330-4 and a plurality of distance sensors 340-4 according to another embodiment is shown. In the embodiment as indicated in FIG. 9, the rotating component 330-4 is extended towards four straight directions D41, D42, D43 and D44 from the rotating shaft 320-4 to form a quadra-branch structure. Every adjacent two of the straight directions D41, D42, D43 and D44 form an angle of 90°. The distance sensors 340-4 are arranged along the straight directions D41, D42, D43 and D44. In the present embodiment, the design of quadra-branch structure is adopted. That is, when the rotating component 330-4 rotates for 90°, the distance sensors 340-4 will be distributed for 360° over the space sensing range SP2.

Figure 10:
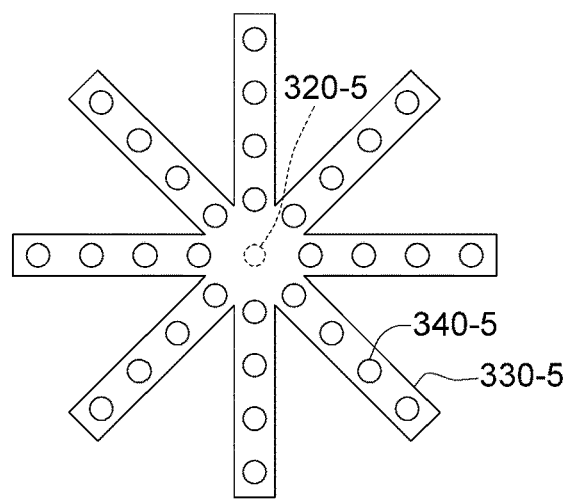
FIG. 10 is a top view of a rotating component and a plurality of distance sensors according to another embodiment.

According to the design of other embodiments, the rotating component 330 can be extended towards s straight directions from the rotating shaft 320 to form an s-branch structure. The distance sensors 340 are arranged along the straight directions, and the straight directions are evenly distributed over 360°. Referring to FIG. 10, a top view of a rotating component 330-5 and a plurality of distance sensors 340-5 according to another embodiment is shown. In the embodiment as indicated in FIG. 10, the number s is exemplified by 8. Thus, the rotating component 330-5 is extended towards 8 straight directions from the rotating shaft 320-5 to form an octa-branch structure.

The above design of the rotating component 330 and the distance sensors 340 can be adjusted according to the sensing period of each of the distance sensors 340. For example, during a rotation cycle of the motor 310, that is, T seconds, the distance sensors 340 need to perform N times of sensing operation, and the time allocated for each detection is T/N seconds. The maximum sensing time of each of the distance sensors 340 is T/N seconds.

Suppose the number of the distance sensors 340 is n. Then, the n distance sensors 340 need to perform n times of drive operation. The maximum value of one sensing time of each of the distance sensors 340 is T/(N*n) seconds.

Suppose the distance sensors 340 be divided into p groups, and the distance sensors 340 of the same group can be driven at the same time. Then, the equivalent drive number of the n distance sensors 340 drops to n/p. Therefore, the maximum value of one sensing time of each of the distance sensors is T/(Nn/p) seconds.

If the rotating component 330 is an s-branch structure, then the maximum value of one sensing time of each of the distance sensors is T/(Nn/ps) seconds. Through the above calculation of the sensing time, suitable grouping or arrangement of the rotating component 330 and the distance sensors 340 can be obtained.

Figure 11:
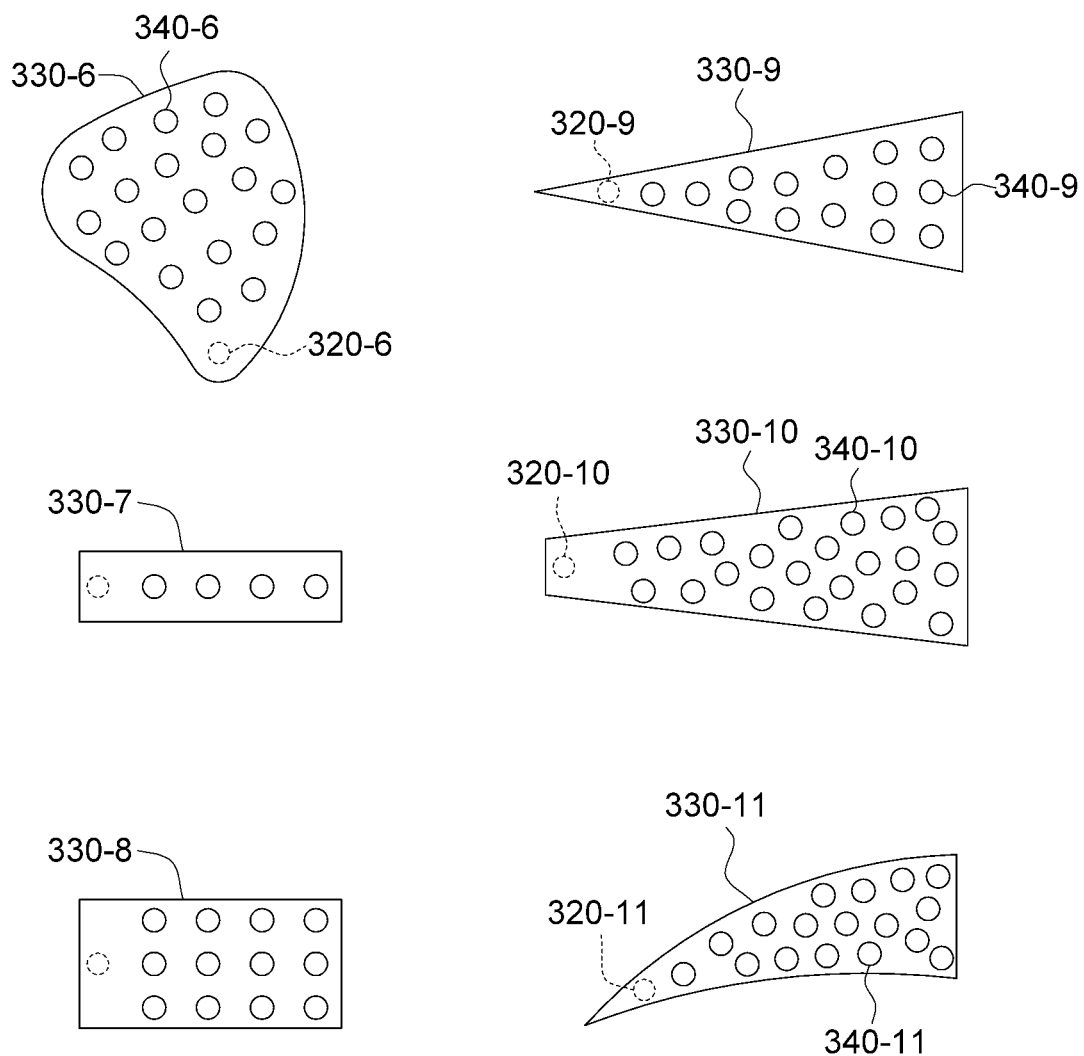
FIG. 11 is a top view of a plurality of rotating components according to a plurality of other embodiments.

Referring to FIG. 11, a top view of a plurality of rotating components 330-6, 330-7, 330-8, 330-9, 330-10 and 330-11 according to other embodiments is shown. The rotating component 330-6 has a knife shape. Both the rotating components 330-7 and 330-8 have a rectangular shape. The rotating component 330-9 has a triangular shape. The rotating component 330-10 has a trapezoidal shape. The rotating component 330-11 has an arced shape. The rotating components 330-6, 330-7, 330-8, 330-9, 330-10 and 330-11 of the above shapes all can realize the above floating control technology.

Besides, a minimum width of the rotating components 330-6, 330-9, 330-10 and 330-11 is located on the rotating shafts 320-6, 320-9, 320-10 and 320-11. The number of the distance sensors 340-6, 340-9, 340-10 and 340-11 increases towards a straight direction from the rotating shafts 320-6, 320-9, 320-10, and 320-11. Thus, more distance sensors 340-6, 340-9, 340-10 and 340-11 are disposed farther away from the rotating shaft 320-6, 320-9, 320-10 and 320-11 to increase the sensing density.

Figure 12:
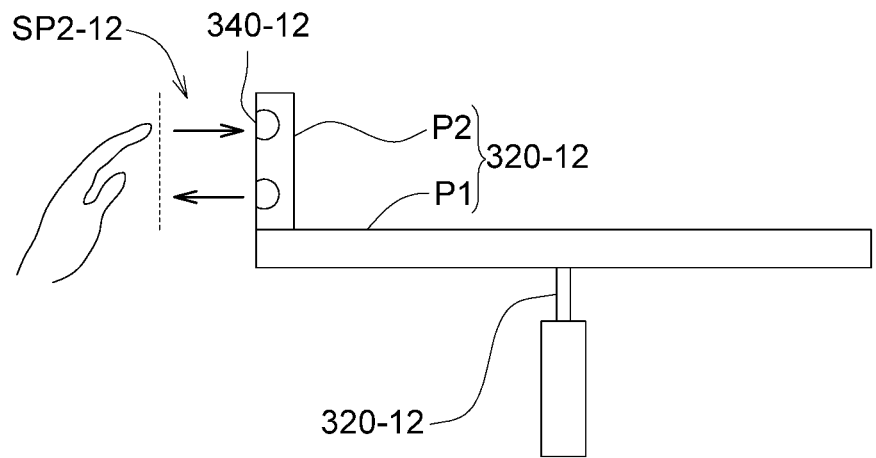
FIG. 12 is a schematic diagram of a rotating component and a plurality of distance sensors according to another embodiment.

Referring to FIG. 12, a schematic diagram of a rotating component 330-12 and a plurality of distance sensors 340-12 according to another embodiment is shown. In the embodiment as indicated in FIG. 12, the rotating component 330-12 includes a first plate P1 and a second plate P2. The first plate P1 is connected to the rotating shaft 320-12, and the second plate P2 is connected to the first plate P1. The first plate P1 and the second plate P2 form an L-shaped structure. The distance sensors 340-12 are disposed on the second plate P2. In the present embodiment, when the rotating component 330-12 rotates, the distance sensors 340-12 form an annular space sensing range SP2-12 for several people to perform floating control.

Figure 13:
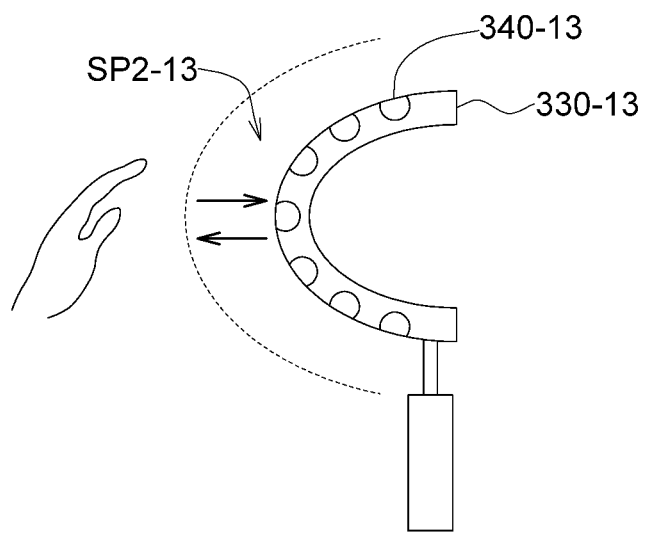
FIG. 13 is a schematic diagram of a rotating component and a plurality of distance sensors according to another embodiment.

Referring to FIG. 13, a schematic diagram of a rotating component 330-13 and a plurality of distance sensors 340-13 according to another embodiment. In the embodiment as indicated in FIG. 13, the rotating component 330-13 is an arced structure. In the present embodiment, when the rotating component 330-13 rotates, the distance sensors 340-13 form a spherical sensing range SP2-13 for several people to perform floating control.

As disclosed in the above embodiments, the floating display device 100 can display a three-dimensional image IM1 in the space display range SP1. The user can perform an operation to the three-dimensional image IM1 directly. The host 200 obtains an operation signal C1 from the floating control device 300 to complete an intuitive operation.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A floating control device, comprising:
   a motor;
   a rotating shaft connected to the motor;
   a rotating component driven by the motor to rotate around the rotating shaft;
   a floating display device configured to display a three-dimensional image in a space display range;
   a plurality of distance sensors disposed on the rotating component, wherein a space sensing range of the distance sensors falls within the space display; and a signal processing unit configured to receive a plurality of sensing signals from the distance sensors to obtain an operation signal.

2. The floating control device according to claim 1, wherein the rotating component is extended towards a straight direction from the rotating shaft to form a branch structure, and the distance sensors are arranged along the straight direction.

3. The floating control device according to claim 1, wherein the rotating component is extended towards two straight directions from the rotating shaft to form a bi-branch structure, the distance sensors are arranged along the two straight directions, and the two straight directions are opposite to each other.

4. The floating control device according to claim 1, wherein the rotating component is extended towards s straight directions from the rotating shaft to form an s-branch structure, s is greater than 2, the distance sensors are arranged along the straight directions, and the straight directions are evenly distributed over 360°.

5. The floating control device according to claim 1, wherein the rotating component has a rectangular shape, a triangular shape, a trapezoidal shape or a knife shape.

6. The floating control device according to claim 1, wherein a minimum width of the rotating component is located on the rotating shaft.

7. The floating control device according to claim 1, wherein the distance sensors are evenly distributed over the rotating component.

8. The floating control device according to claim 1, wherein the number of the distance sensors increases towards a straight direction from the rotating shaft.

9. The floating control device according to claim 1, wherein the rotating component is a planar structure.

10. The floating control device according to claim 1, wherein the rotating component comprises a first plate and a second plate, the first plate is connected to the rotating shaft, the second plate is connected to the first plate, the first plate and the second plate form an L-shaped structure, and the distance sensors are disposed on the second plate.

11. The floating control device according to claim 1, wherein the rotating component is an arced structure.

12. The floating control device according to claim 1, wherein the sensing signals correspond to a two-dimensional coordinate system or a three-dimensional coordinate system.

13. An operation method of a floating control device, comprising:
a floating display device configured to display a three-dimensional image in a space display range;
rotating a rotating component to drive a plurality of distance sensors disposed on the rotating component to rotate, wherein a space sensing range of the distance sensors falls within the space display; and
receiving a plurality of sensing signals from the distance sensors; and
converting the sensing signals into an operation signal.

14. The operation method of a floating control device according to claim 13, wherein the rotating component has a rotation cycle of T seconds, the step of receiving the sensing signals from the distance sensors is performed at an interval of T/N seconds to receive the sensing signals at N evenly spaced positions of 360°.

15. The operation method of a floating control device according to claim 13, wherein in the step of converting the sensing signals into the operation signal, a conversion between a polar coordinate system and a Cartesian coordinate system is performed.

16. An interactive display system, comprising:
a floating display device configured to display a three-dimensional image in a space display range; and
a floating control device, comprising:
a motor;
a rotating shaft connected to the motor;
a rotating component driven by the motor to rotate around the rotating shaft;
a plurality of distance sensors disposed on the rotating component, wherein a space sensing range of the distance sensors falls within a space display; and
a signal processing unit configured to receive a plurality of sensing signals from the distance sensors to obtain an operation signal.

17. The interactive display system according to claim 16, wherein the rotating component is extended towards a straight direction from the rotating shaft to form a branch structure, and the distance sensors are arranged along the straight direction.

18. The interactive display system according to claim 16, wherein the rotating component is extended towards two straight directions from the rotating shaft to form a bi-branch structure, the distance sensors are arranged along the two straight directions, and the two straight directions are opposite to each other.

19. The interactive display system according to claim 16, wherein the rotating component is extended towards s straight directions from the rotating shaft to form an s-branch structure, s is greater than 2, the distance sensors are arranged along the straight directions, and the straight directions are evenly distributed over 360°.

20. The interactive display system according to claim 16, wherein the sensing signals correspond to a two-dimensional coordinate system or a three-dimensional coordinate system.

* * * * *